(12) United States Patent
Solanki et al.

(10) Patent No.: US 11,545,804 B2
(45) Date of Patent: Jan. 3, 2023

(54) CONNECTOR ASSEMBLING MACHINE

(71) Applicant: TE Connectivity Services GmbH, Schaffhausen (CH)

(72) Inventors: Swapnilsinh Solanki, Harrisburg, PA (US); Scott Thomas Schlegel, Middletown, PA (US); Jiankun Zhou, Mechanicsburg, PA (US); Roberto Francisco-Yi Lu, Bellevue, WA (US); Edward T. Price, III, Mechanicsburg, PA (US); David Wiltraut, Middletown, PA (US)

(73) Assignee: TE Connectivity Solutions GmbH

( * ) Notice: Subject to any disclaimer, the term of this patent is extended or adjusted under 35 U.S.C. 154(b) by 78 days.

(21) Appl. No.: 17/202,461

(22) Filed: Mar. 16, 2021

(65) Prior Publication Data
US 2022/0302664 A1 Sep. 22, 2022

(51) Int. Cl.
*H01R 43/20* (2006.01)
*B25J 15/00* (2006.01)

(52) U.S. Cl.
CPC .............. *H01R 43/20* (2013.01); *B25J 15/00* (2013.01)

(58) Field of Classification Search
CPC .......... H01R 43/20; H01R 13/03; B25J 15/00; H05K 13/0426; Y10T 29/49208; Y10T 29/53209
USPC .................................................. 29/747, 760
See application file for complete search history.

(56) References Cited

U.S. PATENT DOCUMENTS

| 4,657,337 A | * | 4/1987 | Kyle ...................... H01R 13/03 29/878 |
| 4,680,841 A | * | 7/1987 | Schneider .............. H01R 43/01 29/33 M |
| 5,701,662 A | * | 12/1997 | Imai ................... H05K 13/0426 29/838 |

(Continued)

FOREIGN PATENT DOCUMENTS

| EP | 0286207 A1 | 2/1993 |
| EP | 1257020 A2 | 10/1998 |
| JP | 2003208960 A | * 7/2003 |

OTHER PUBLICATIONS

International Search Report, Application No. IB2022/052345, Filing Date Mar. 15, 2022.

*Primary Examiner* — Donghai D Nguyen

(57) ABSTRACT

A connector assembling machine a revolver mechanism coupled to a frame. The revolver mechanism includes a shaft coupled to the frame, an actuator operably coupled to the shaft to rotate the shaft, and a rotor rotated by the shaft. The rotor includes a hub coupled to the shaft and mounting brackets extending from the hub. The revolver mechanism includes cartridges coupled to the mounting brackets each having cartridge walls forming a connector cavity configured to receive an electrical connector. The cartridge has a window exposing receptacles of the electrical connector. The rotor is rotated to move the cartridges between a connector loading station, a connector processing station, and a connector unloading station. The cartridges are loaded with the electrical connectors in the connector loading station and unloaded in the connector unloading station. The cartridges position the electrical connectors for loading support plates into the receptacles in the connector processing station.

20 Claims, 4 Drawing Sheets

(56) References Cited

U.S. PATENT DOCUMENTS

| | | | |
|---|---|---|---|
| 5,771,578 A * | 6/1998 | King, Jr. | H01R 4/22 29/593 |
| 7,670,177 B2 | 3/2010 | Myer et al. | |
| 10,265,821 B2 * | 4/2019 | Deng | H05K 13/021 |
| 2002/0174537 A1 | 11/2002 | Chujo et al. | |

* cited by examiner

CONNECTOR ASSEMBLING MACHINE

BACKGROUND OF THE INVENTION

The subject matter herein relates generally to connector assembling machines.

Electrical connectors often have many contacts, which extend between a mating end and a terminating end of the electrical connector. The contacts are held within a connector housing for mating with a mating electrical connector and mounting to a circuit board. However, the contacts are susceptible to damage when being mounted to the circuit board or when being mated with the mating electrical connector. For example, the exposed portions of the contacts, which are cantilevered or free standing, may be bent and damaged if not properly aligned with the circuit board or the mating electrical connector. Some known electrical connectors use pin organizers and support plates to support and align the ends of the contacts. However, loading the support plates into the connector housings may be difficult and time consuming. Additionally, some known electrical connectors have irregular shapes, such as depending on how the contacts are routed between the mating interface and the terminating interface. The irregular shapes make holding the connector housings steady while loading the support plates difficult.

A need remains for a connector assembling machine for installing support plates in connector housings in a reliable and efficient manner.

BRIEF DESCRIPTION OF THE INVENTION

In one embodiment, a connector assembling machine for assembling electrical connectors each includes a connector housing holding contacts arranged in receptacles supported by support plates received in the receptacles is provided. The connector assembling machine includes a frame having a base and end walls extending from the base. The connector assembling machine includes a revolver mechanism coupled to the frame. The revolver mechanism includes a shaft coupled to the end walls, an actuator operably coupled to the shaft to rotate the shaft, and a rotor rotated by the shaft. The rotor includes a hub coupled to the shaft and mounting brackets extending from the hub. The revolver mechanism includes cartridges coupled to the mounting brackets. Each cartridge includes cartridge walls forming a connector cavity configured to receive the electrical connector. The cartridge having a window exposing the receptacles of the electrical connector in the cavity. The rotor is rotated to move the cartridges between a connector loading station, a connector processing station, and a connector unloading station. The cartridges are configured to be loaded with the electrical connectors in the connector loading station. The cartridges are configured to be unloaded in the connector unloading station. The cartridges positions the electrical connectors for loading the support plates into the receptacles of the connector housings in the connector processing station.

In another embodiment, a connector assembling machine for assembling electrical connectors each includes a connector housing holding contacts arranged in receptacles supported by support plates received in the receptacles. The connector assembling machine includes a frame having a base and end walls extending from the base. The connector assembling machine includes a revolver mechanism coupled to the frame. The revolver mechanism includes a shaft coupled to the end walls, an actuator operably coupled to the shaft to rotate the shaft, and a rotor rotated by the shaft. The rotor includes a hub coupled to the shaft and mounting brackets extending from the hub. The revolver mechanism includes cartridges coupled to the mounting brackets. Each cartridge includes cartridge walls forming a connector cavity configured to receive the electrical connector. The cartridge walls includes a first side wall, a second side wall, and an end wall extending between the first and second side walls. The first and second side walls includes first and second grooves, respectively, configured to receive a flange of the connector housing to locate the connector housing in the cavity. The end wall having a window exposing the receptacles of the electrical connector in the cavity. The rotor is rotated to move the cartridges between a connector loading station, a connector processing station, and a connector unloading station. The cartridges are configured to be loaded with the electrical connectors in the connector loading station. The cartridges are configured to be unloaded in the connector unloading station. The cartridges positions the electrical connectors for loading the support plates into the receptacles of the connector housings in the connector processing station.

In a further embodiment, a connector assembling machine for assembling electrical connectors each includes a connector housing holding contacts arranged in receptacles supported by support plates received in the receptacles is provided. The connector assembling machine includes a frame having a base and end walls extending from the base. The connector assembling machine includes a revolver mechanism coupled to the frame. The revolver mechanism includes a shaft coupled to the end walls, an actuator operably coupled to the shaft to rotate the shaft, and a rotor rotated by the shaft. The rotor includes a hub coupled to the shaft and mounting brackets extending from the hub. The revolver mechanism includes cartridges coupled to the mounting brackets. Each cartridge includes cartridge walls forming a connector cavity configured to receive the electrical connector. The cartridge having a window exposing the receptacles of the electrical connector in the cavity, the rotor is rotated to move the cartridges between a connector loading station, a connector processing station, and a connector unloading station. The cartridges configured to be loaded with the electrical connectors in the connector loading station. The cartridges configured to be unloaded in the connector unloading station. The cartridges positions the electrical connectors for loading the support plates into the receptacles of the connector housings in the connector processing station. The connector assembling machine includes a support plate loader mechanism adjacent the revolver mechanism. The support plate loader mechanism having a support plate manipulator and an end effector provided at an end of the support plate manipulator. The end effector is configured to hold the support plates. The support plate manipulator is configured to move the end effector and the support plates to the processing station to load the support plates in the receptacles of the electrical connectors.

DETAILED DESCRIPTION OF THE INVENTION

Figure 1:
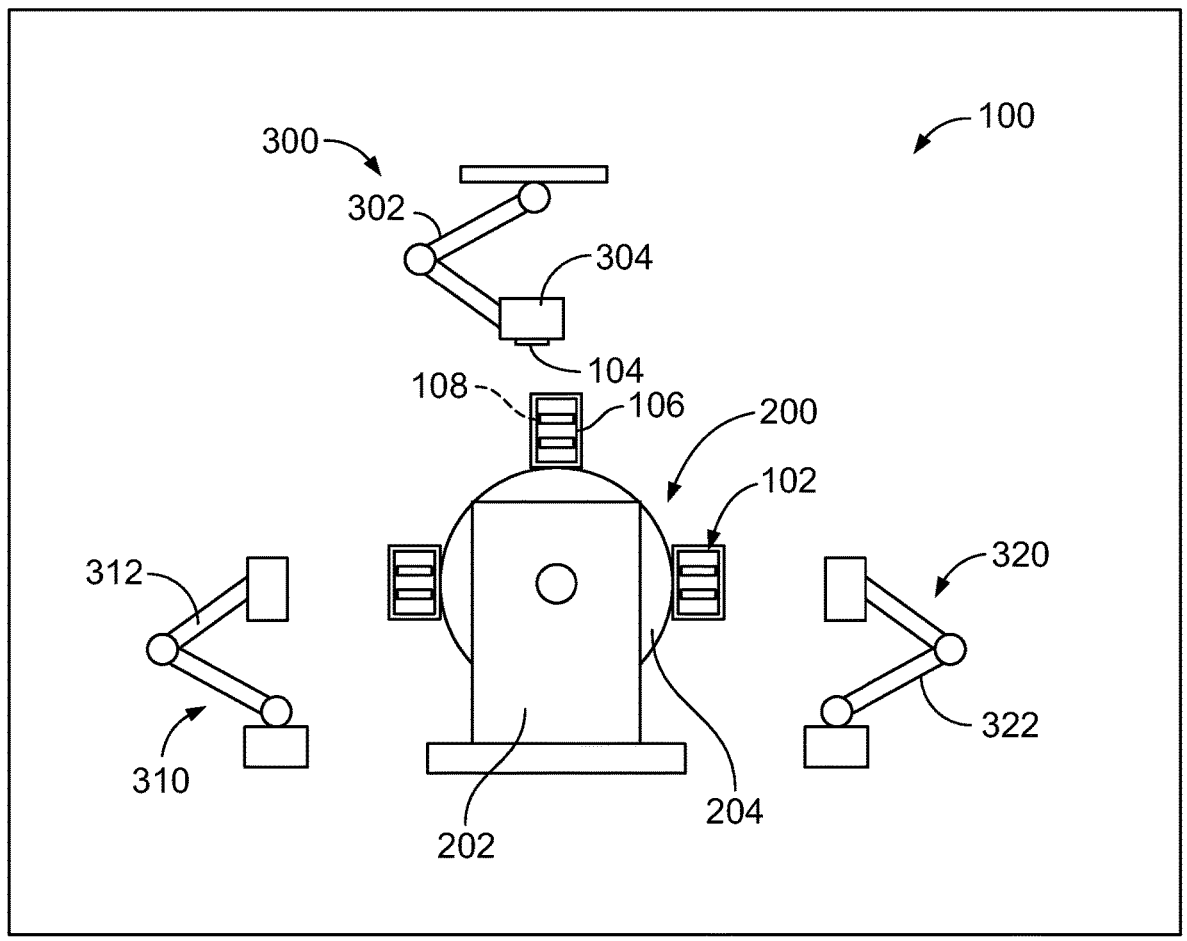
FIG. 1 illustrates a connector assembling machine in accordance with an exemplary embodiment.

FIG. 1 illustrates a connector assembling machine 100 in accordance with an exemplary embodiment. The connector assembling machine 100 is used to assemble electrical connectors 102. In an exemplary embodiment, the connector assembling machine 100 is used to load support plates 104 into connector housings 106 to interface with contacts 108 of the electrical connectors 102. The electrical connectors 102 include many contacts 108, which are supported by the support plates 104. The connector assembling machine 100 precisely loads the support plates 104 into place within the connector housings 106 to interface with the contacts 108.

The connector assembling machine 100 includes a revolver mechanism 200 that supports the electrical connectors 102 during the assembly process. The connector assembling machine 100 includes a frame 202 that supports a rotor 204 of the revolver mechanism 200. The revolver mechanism 200 is configured to move the electrical connectors 102 between various stations to allow various processes to occur simultaneously to reduce overall assembly time. In an exemplary embodiment, the connector assembling machine 100 includes a support plate loader mechanism 300 used to load the support plates 104 into the connector housings 106 at one or more of the stations. In an exemplary embodiment, the connector assembling machine 100 includes a connector loading mechanism 310 used to load the electrical connectors into the revolver mechanism 200. In an exemplary embodiment, the connector assembling machine 100 includes a connector unloading mechanism 320 used to load the electrical connectors into the revolver mechanism 200.

The support plate loader mechanism 300 is loaded adjacent the revolver mechanism 200. The support plate loader mechanism 300 includes a support plate manipulator 302 and an end effector 304 provided at an end of the support plate manipulator 302. The end effector 304 holds the support plates 104. For example, the end effector 304 may include a suction cup, a vacuum device, a clamp, or another type of holder. Optionally, multiple end effectors 304 may be provided for holding multiple support plates 104 and loading multiple support plates 104 into the connector housing 106 simultaneously. The support plate manipulator 302 is movable relative to the revolver mechanism 200 to move the end effector(s) 304 to load the support plates 104 into the connector housing 106. In various embodiments, the support plate manipulator 302 is movable in three-dimensional space. For example, the support plate manipulator 302 may include a robotic arm, such as a six-axis robotic arm. Other types of manipulators may be used in alternative embodiments, such as a linear actuator configured to move the support plates 104 in a linear loading direction.

The connector loading mechanism 310 includes a connector manipulator 312 used to hold and move the electrical connector 102 during the loading process. In various embodiments, the connector manipulator 312 may include a robotic arm having a gripper mechanism used to hold the electrical connector 102. Other types of manipulators may be used in alternative embodiments, such as a pusher type of actuator. In alternative embodiments, the electrical connector may be manually loaded.

The connector unloading mechanism 320 includes a connector manipulator 322 used to hold and move the electrical connector 102 during the unloading process in various embodiments, the connector manipulator 322 may include a robotic arm having a gripper mechanism used to hold the electrical connector 102. Other types of manipulators may be used in alternative embodiments, such as a pusher type of actuator. In alternative embodiments, the electrical connector may be manually unloaded.

Figure 2:
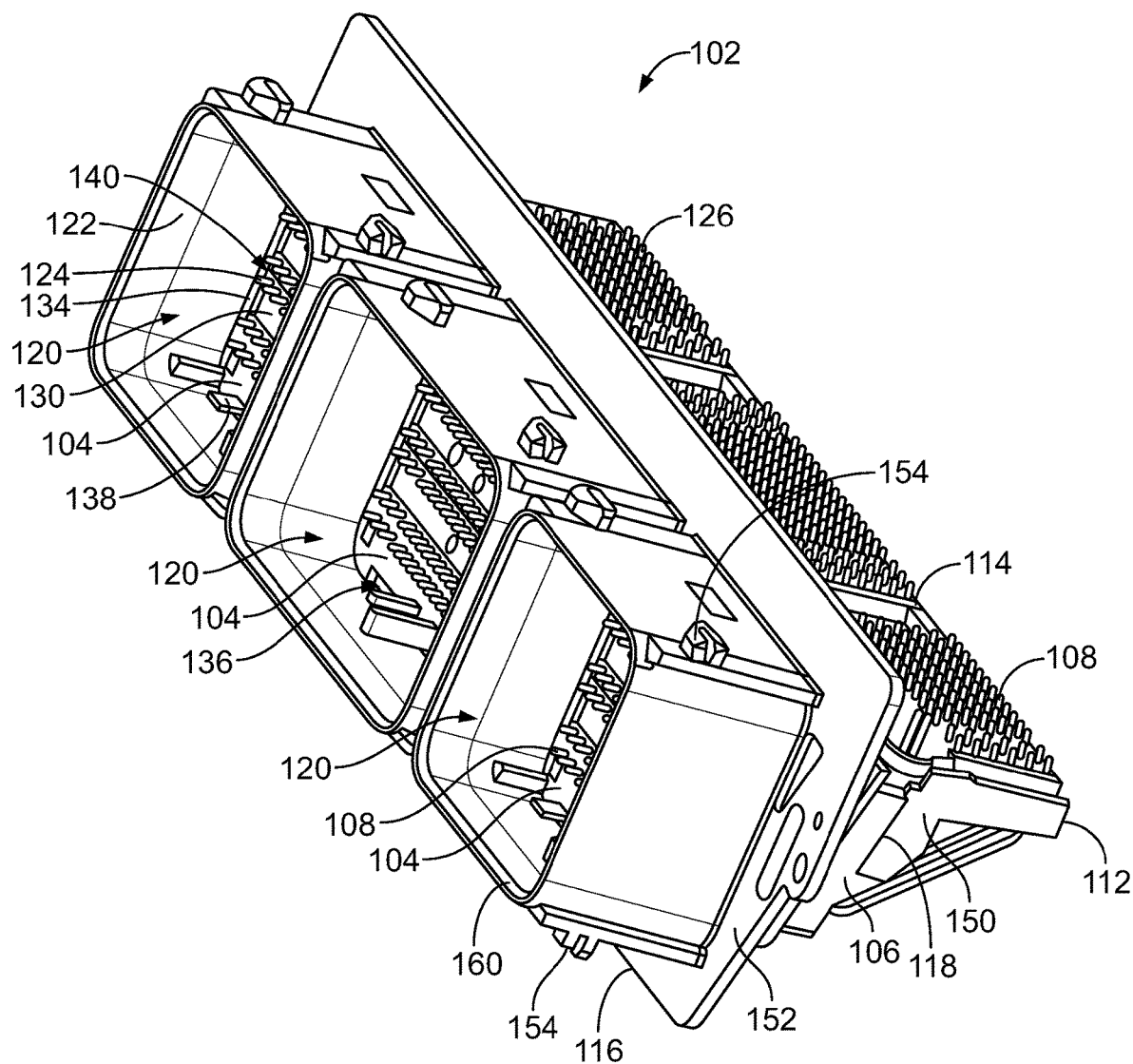
FIG. 2 is a bottom perspective view of the electrical connector in accordance with an exemplary embodiment.

FIG. 2 is a bottom perspective view of the electrical connector 102 in accordance with an exemplary embodiment. The electrical connector 102 includes the connector housing 106, which holds the contacts 108. The support plates 104 are used to support the mating ends of the contacts 108. The support plates 104 are separate and discrete from the connector housing 106 and loaded into the connector housing 106 over the ends of the contacts 108. In an exemplary embodiment, the connector housing 106 is a right-angle connector housing having a mating end and a mounting end oriented perpendicular to each other. Other configurations are possible in alternative embodiments.

The connector housing 106 includes a front 110, a rear 112, a top 114, and a bottom 116. The connector housing 106 includes sides 118 between the front and rear 110, 112 and between the top and bottom 114, 116. In an exemplary embodiment, the front 110 is a mating end of the connector housing 106 and the bottom 116 is a mounting end of the connector housing 106. The connector housing 106 includes receptacles 120 at the front 110. The receptacles 120 are configured to receive plugs of a mating electrical connector. The connector housing 106 includes shroud walls 122 surrounding the receptacles 120. The shroud walls 122 may surround the receptacles 120 on all four sides to enclose the receptacles 120.

Mating ends 124 of the contacts 108 extend into the receptacles 120 for mating with the mating electrical connector. The support plates 104 are received in the receptacles 120 to support the mating ends 124 of the contacts 108. In an exemplary embodiment, each receptacle includes a plurality of the contacts 108. The contacts 108 may be arranged in rows and columns. In an exemplary embodiment, the electrical connector 102 includes hundreds of contacts, each of which are supported relative to each other by the support plate 104 for mating with the mating electrical connector. The mating ends 124 may be pins in various embodiments. Other types of mating interfaces may be provided in other embodiments, such as sockets or spring beams. The contacts 108 includes terminating ends 126 opposite the mating ends 124. In the illustrated embodiment, the terminating ends 126 include compliant pins configured to be press-fit into a circuit board. Other types of terminating ends may be provided in alternative embodiments, such as solder tails, solder balls, solder pads or other interfaces. In the illustrated embodiment, the contacts 108 are right angle contacts such that the mating ends 124 are oriented perpendicular to the terminating ends 126. In various embodiments, the contacts 108 may be formed from lead frames separately loaded into the connector housing 106. The lead frames may be overmolded to hold the contacts 108 relative to each other. The terminating ends 126 and the mating ends 124 extend from the overmolded body and are cantilevered for mating with the circuit board and the mating electrical connector, respectively. The support plates 104 are used to support the cantilevered mating ends 124 to hold relative positions of the mating ends and guide mating with the mating electrical connector.

The support plates 104 are sized and shaped to fit in the corresponding receptacles 120. Optionally, the support plate 104 may have different sizes and/or shapes to fit in the different receptacles. Each support plate 104 has a front face 130 and a rear face (not shown) opposite the front face 130. A perimeter edge 134 surrounds the support plate 104. The perimeter edge 134 may be sized and shaped to correspond to the shroud walls 122. Optionally, the perimeter edges 134 may engage the shroud walls 122 to position the support plates 104 in the receptacles 120. In an exemplary embodiment, the support plate 104 includes locating features 136 used to position or locate the support plate 104 in the receptacle 120. For example, the locating features 136 may include notches, slots, tabs, rails, the like is interface with corresponding features of the connector housing 106. In an exemplary embodiment, the support plate 104 includes latching features 138 used to secure the support plate 104 to the shroud walls 122 in the receptacle 120. For example, the latching features 138 may be deflectable latches. The latching features 138 may extend forward of the front face 130 and/or rearward of the rear face. In an exemplary embodiment, the support plate 104 includes contact openings 140 through the support plate 104. The contact openings 140 receive the mating ends 124 of the contacts 108. The connector assembling machine 100 (shown in FIG. 1) is used to load the support plate 104 into the receptacles 120 such that the mating ends 124 of the contacts 108 extend through the contact openings 140.

In an exemplary embodiment, the connector housing 106 includes a housing base 150 that receives the contacts 108. The shroud walls 122 extend forward of the housing base 150. In an exemplary embodiment, the connector housing 106 includes a flange 152 surrounding the housing base 150. The flange 152 is located rearward of the shroud walls 122. The flange 152 may be used for mounting the connector housing 106 to a chassis or other structure. The contacts 108 extend rearward of the flange 152 to the terminating ends 126. In the illustrated embodiment, the connector housing 106 includes tabs 154 extending from the shroud walls 122. The tabs 154 may be used for connection with the mating electrical connector. For example, the tabs 154 may be latching features configured to engage latches of the mating electrical connector to secure the mating electrical connector to the connector housing 106. The tabs 154 may additionally or alternatively be used as keying features to guide mating with the mating electrical connector.

Figure 3:
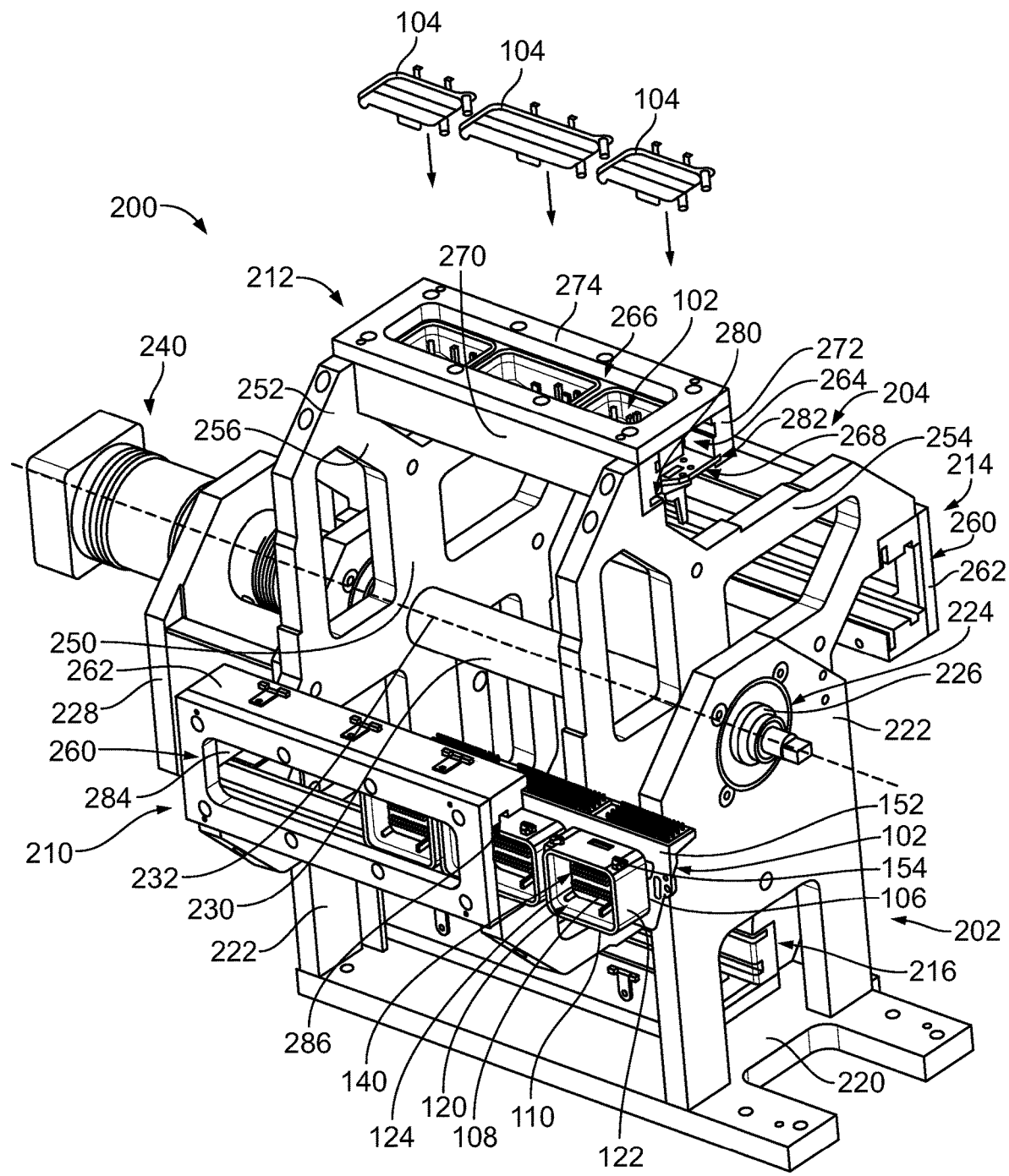
FIG. 3 illustrates the revolver mechanism in accordance with an exemplary embodiment.

FIG. 3 illustrates the revolver mechanism 200 in accordance with an exemplary embodiment. The revolver mechanism 200 includes the frame 202 and the rotor 204 supported by the frame 202. The rotor 204 is rotatable relative to the frame 202. In an exemplary embodiment, the rotor 204 is movable to different positions or stations to perform various assembly processes.

In an exemplary embodiment, the rotor 204 is positionable in one or more connector loading stations 210; the rotor 204 is positionable in one or more connector processing stations 212; and the rotor 204 is positionable in one or more connector unloading stations 214. The electrical connector 102 is loaded into the revolver mechanism 200 at the corresponding connector loading station 210. The electrical connector 102 is unloaded from the revolver mechanism 200 at the corresponding connector unloading station 214. The electrical connector 102 is assembled at the corresponding connector processing station 212. For example, the support plate 104 are configured to be loaded into the connector housing 106 at the connector processing station 212. The revolver mechanism 200 repeatedly and reliably holds the connector housings 106 at the connector processing station 212 for controlled loading of the support plates 104 into the connector housings 106.

In the illustrated embodiment, the revolver mechanism 200 includes four stations including one connector loading station 210, one connector processing station 212, one connector unloading station 214 and one staging station 216. The rotor 204 moves in 90° steps between the stations. However, in alternative embodiments, the revolver mechanism 200 may include greater or fewer stations, such as three stations (without the staging station 216) where the rotor is rotated 120° between the steps. In other various embodiments, the revolver mechanism 200 may include a single connector loading station 210 and a single connector unloading station 214 and multiple connector processing stations 212 (for example, load a single support plate at each connector processing station or performing other assembly processes at different stations). In other various embodiments, the revolver mechanism 200 may include multiple connector loading stations 210, multiple connector unloading stations 214 and multiple connector processing stations 212. As such, multiple electrical connectors may be loaded simultaneously, processed simultaneously, and unloaded simultaneously.

The frame 202 includes a base 220 and end walls 222 extending outward from the base 220. In various embodiments, the end walls 222 are discrete walls from the base 220 and coupled thereto, such as using fasteners. Optionally, the base 220 may be secured to the floor using fasteners. The end wall 222 include openings 224 that support bearings 226. The bearings 226 are used to support the rotor 204 and allow the rotor 204 to rotate relative to the frame 202. In an exemplary embodiment, the frame 202 includes an actuator support 228, which may extend from the base 220 or one of the end walls 222.

The revolver mechanism 200 includes a shaft 230 coupled to the end wall 222. For example, the shaft 230 may be coupled to the bearings 226 to rotate relative to the end walls 222. The rotor 204 is coupled to the shaft 230. In various embodiments, the rotor 204 may be integral with the shaft 230. The shaft 230 extends along an axis 232. In the illustrated embodiment, the axis 232 is perpendicular to the end walls 222 and parallel to the base 220. Other orientations are possible in alternative embodiments.

The revolver mechanism 200 includes an actuator 240 operably coupled to the shaft 230. The actuator 240 is used to rotate the shaft 230. In various embodiments, the actuator 240 is an electric actuator having a motor and a driveshaft coupled to the shaft 230. The actuator support 228 is used to support the actuator 240, such as along the axis 232. Optionally, the actuator 240 may be operable in a forward direction and a reverse direction to rotate the rotor 204.

The rotor 204 is coupled to the shaft 230 and rotated by the actuator 240. The rotor 204 includes a hub 250 and a plurality of cartridges 260 coupled to the hub 250. In the illustrated embodiment, the hub 250 includes mounting brackets 252 radially spaced apart around the hub 250. The cartridges 260 are coupled to corresponding mounting brackets 252. In the illustrated embodiment, the rotor 204 includes four mounting brackets 252 supporting an equal number of cartridges 260. In an alternative embodiment, each mounting bracket 252 may support multiple cartridges 260 (for example, two cartridges 260 side-by-side to increase the total number of cartridges 260 supported by the rotor 204). In the illustrated embodiment, the hub 250 includes a first plate 254 and a second plate 256. The first and second plates 254, 256 are provided at opposite ends of the shaft 230 and are separated by a gap. The hub 250 may have other structures in alternative embodiments. The first and second plates 254, 256 may be metal plates, such as steel plates. In alternative embodiments, the first and second plates 254, 256 may be manufactured from a plastic material.

In an exemplary embodiment, the cartridges 260 are separate and discrete from the hub 250 and are configured to be removably coupled to the hub 250 at the mounting brackets 252. As such, the cartridges 260 may be replaced, such as to accommodate different electrical connectors 102. The cartridges 260 are sized and shaped to receive the electrical connectors 102 and all the electrical connectors 102 at fixed positions for assembly, such as for loading the support plate 104 into the connector housings 106. In the illustrated embodiment, the cartridges 260 are generally rectangular shaped to receive the electrical connectors 102; however, the cartridges 260 may have other shapes in alternative embodiments.

In an exemplary embodiment, each cartridge 260 includes cartridge walls 262 forming a connector cavity 264 configured to receive the electrical connector 102. The cartridge 260 has a window 266 providing access to the electrical connector 102 in the connector cavity 264. In an exemplary embodiment, the cartridge 260 includes a rear opening 268 opposite the window 266. The rear opening 268 allows a portion of the electrical connector 102 to extend from the cartridge 260 (exterior of the cartridge 260). The rear opening 268 allows the cartridge 260 to accommodate oddly shaped portions of the electrical connector 102 (for example, the rear side of the electrical connector 102).

In an exemplary embodiment, the cartridge walls 262 include a first side wall 270, a second side wall 272 and an end wall 274 extending between the first side wall 270 and the second side wall 272. The end wall 274 includes the window 266. The rear opening 268 is located between the first and second side walls 270, 272 opposite the end wall 274. In an exemplary embodiment, the cartridge walls 262 are separate and discrete walls that are coupled together using fasteners. The size and shape of the connector cavity 264 as well as features of the cartridge 260 may be altered by changing one or more of the cartridge walls 262, such as to accommodate different electrical connectors 102. In an exemplary embodiment, the first side wall 270 is coupled to the mounting bracket 252 using fasteners. The end wall 274 extends from the first side wall 270 and the second side wall 272 extends from the end wall 274. In the illustrated embodiment, the second side wall 272 hangs free of the hub 250, rather being supported by the end wall 274 and the first side wall 270. Other mounting arrangements are possible in alternative embodiments.

In an exemplary embodiment, the cartridge 260 includes one or more locating features 280 used to locate the electrical connector 102 relative to the cartridge 260. Optionally, the interior surfaces of the side walls 270, 272 and/or the end wall 274 may define the locating features 280. For example, the interior surfaces may engage the electrical connector 102 to locate the electrical connector 102 within the connector cavity 264. In an exemplary embodiment, the locating features 280 include slots 282 formed in the first and second side walls 270, 272. The slots 282 receives the flange 152 of the connector housing 106. Optionally, the slots 282 are sized to hold the flange 152 by an interference fit to resist shifting of the electrical connector 102 relative to the cartridge 260. In an exemplary embodiment, the locating features 280 include a stop wall or stop tab 284. The stop tab 284 may extend into the connector cavity 264 to engage the electrical connector 102 to stop loading of the electrical connector 102 into the connector cavity 264. The stop tab 284 locate the electrical connector 102 within the connector cavity 264. Other types of locating features 280 may be used in alternative embodiments.

In an exemplary embodiment, the first and second side walls 270, 272 include grooves 286 that receive the tabs 154. The grooves 286 may be oversized relative to the tabs 154 to allow loading and unloading of the electrical connectors 102 without interference from the side walls 270, 272. The cartridge 260 may include other structures to accommodate features of the electrical connector 102.

During operation, electrical connectors 102 are loaded into the revolver mechanism 200 and removed from the revolver mechanism 200. As the electrical connectors 102 are rotated to the various stations of the revolver mechanism 200, various assembly processes may occur. For example, the support plate 104 may be loaded into the connector housing 2106 at one or more of the connector processing stations 212. In an exemplary embodiment, the revolver mechanism 200 is rotated in stages or steps a predetermined amount (for example, 90°) at a time. The revolver mechanism 200 waits between steps for or to loading, unloading and assembly to occur before again rotating the next step.

At the connector loading station 210, an empty cartridge 260 is presented. The electrical connector 102 is loaded into the connector cavity 264 of the cartridge 260 through the open side. The electrical connector 102 may be manually loaded into the cartridge 260 or may be loaded using an electrical connector loading mechanism, such as a robotic arm or pusher mechanism used to automatically load the electrical connector 102 into the cartridge 260. During loading, the flange 152 is aligned with the slots 282. The shroud walls 122 are located between the first and second side walls 270, 272. The front 110 of the connector housing 106 faces the end wall 274. The electrical connector 102 is slid into the connector cavity 264 sideways to a loaded position. Optionally, the electrical connector 102 may be loaded into the connector cavity 264 until the electrical connector 102 engages the stop tab 284 opposite the open sides of the cartridge 260. The rear portion of the electrical connector 102 extends through the rear opening 268 to the exterior of the cartridge 260. The receptacles 120 are open and accessible through the window 266. Once loaded, the revolver mechanism 200 is operated to rotate the loaded cartridge 260 to the next station, such as the connector processing station 212. The rotation of the revolver mechanism 200 presents a new empty cartridge 260 to the connector loading station 210.

At the connector processing station 212 the electrical connector 102 is located at a fixed, known position. In the illustrated embodiment, the end wall 274 faces in an upward direction. The window 266 is provided at the top of the cartridge 260. The support plate 104 are configured to be loaded through the window 266 into the receptacles 120. The support plate loader mechanism 300 (shown in FIG. 1) is used to automatically load the support plate 104 into the connector housing 106 by programmable control. The support plate 104 are loaded through the window 266 into the receptacles 120. The contact openings 140 in the support plate 104 are aligned with the mating ends 124 of the contacts 108 by the support plate loader mechanism 300 to allow loading of the multiple contacts 108 through the support plates 104. Once the support plates 104 are assembled, the revolver mechanism 200 is operated to rotate the cartridge 260 to the next station, such as the connector unloading station 214. In other embodiments, multiple connector processing stations 212 may be provided such that the cartridge 260 has multiple assembly steps between the connector loading station 210 and the connector unloading station 214. The rotation of the revolver mechanism 200 presents a new cartridge 260 to the connector processing station 212.

At the connector unloading station 214, the loaded cartridge 260 is presented. The electrical connector 102 is then unloaded from the cartridge 260 through the open side. The electrical connector 102 may be manually unloaded or unloaded using a connector unloading mechanism, such as a robotic arm configured to grab the electrical connector 102 or a pusher mechanism configured to push the electrical connector 102 out of the cartridge 260. Once unloaded, the electrical connector 102 may be transported to another assembling machine for further assembly, such as mounting to a circuit board, or may be transported to a packaging machine for packaging the electrical connector 102 for shipment. Once unloaded, the revolver mechanism 200 is operated to rotate the loaded cartridge 260 to the next station, such as the connector loading station 210 or a staging station 216. The rotation of the revolver mechanism 200 presents a new cartridge 260 to the connector unloading station 214.

Figure 4:
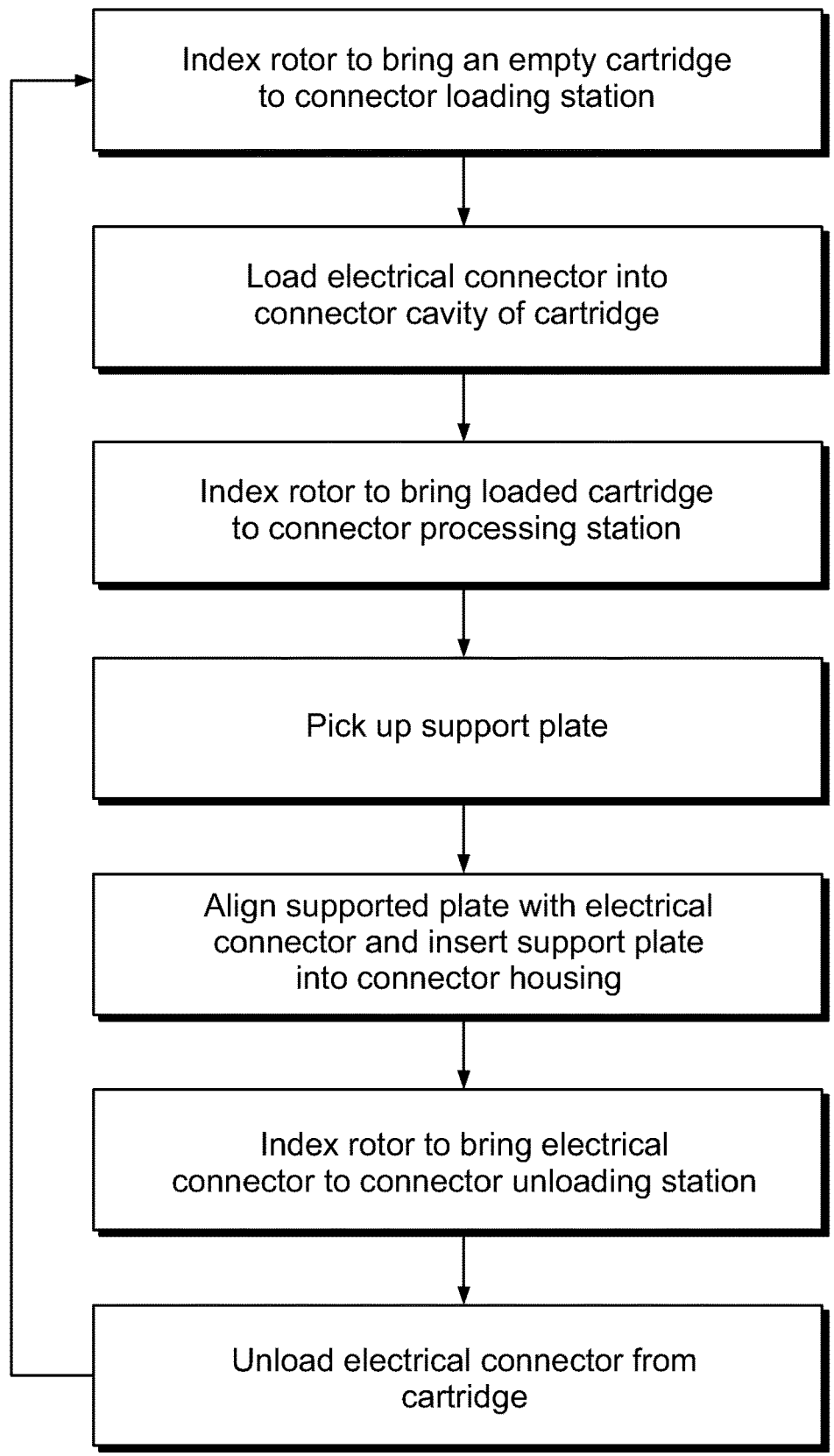
FIG. 4 is a flowchart showing a method of operation of the connector assembling machine in accordance with an exemplary embodiment.

FIG. 4 is a flowchart showing a method of operation of the connector assembling machine 100 in accordance with an exemplary embodiment. At 400, the revolver mechanism indexes the rotor to bring in an empty cartridge to the connector loading station. At 402, the connector loading mechanism loads an electrical connector into the connector cavity of the cartridge. At 404, the revolver mechanism indexes the rotor to bring the loaded cartridge and electrical connector to the connector processing station. At 406, the support plate loader mechanism picks up the support plates. At 408, the support plate loader mechanism aligns the support plates with the electrical connector and inserts the support plates into the corresponding receptacles of the connector housing through the window of the cartridge. At 410, the revolver mechanism indexes the rotor to bring the assembled electrical connector to the connector unloading station. At 412, the connector unloading mechanism unloads the electrical connector from the cartridge. The cycle repeats.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A connector assembling machine for assembling electrical connectors each including a connector housing holding contacts arranged in receptacles supported by support plates received in the receptacles, the connector assembling machine comprising:
   a frame having a base and end walls extending from the base;
   a revolver mechanism coupled to the frame, the revolver mechanism including a shaft coupled to the end walls, an actuator operably coupled to the shaft to rotate the shaft, and a rotor rotated by the shaft, the rotor including a hub coupled to the shaft and mounting brackets extending from the hub, the revolver mechanism including cartridges coupled to the mounting brackets, each cartridge including cartridge walls forming a connector cavity configured to receive an electrical connector, the cartridge having a window exposing the receptacles of the electrical connector in the cavity;
   wherein the rotor is rotated to move the cartridges between a connector loading station, a connector processing station, and a connector unloading station, the cartridges configured to be loaded with the electrical connectors in the connector loading station, the cartridges configured to be unloaded in the connector unloading station, the cartridges positioning the electrical connectors for loading the support plates into the receptacles of the connector housings in the connector processing station.

2. The connector assembling machine of claim 1, wherein the window, at the connector processing station, is upward facing.

3. The connector assembling machine of claim 1, wherein the connector processing station is positioned a first radial distance from the connector loading station and a second radial distant from the connector unloading station, the first distance being equal to the second distance.

4. The connector assembling machine of claim 1, wherein the connector positioning station is a first connector positioning station, the rotor including a second connector processing station between the connector loading station and the connector unloading station.

5. The connector assembling machine of claim 1, wherein the cartridges are removable from the rotor.

6. The connector assembling machine of claim 1, wherein the windows face in a first direction at the connector loading station, the windows facing in a second direction at the connector processing station, and the windows facing in a third direction at the connector unloading station.

7. The connector assembling machine of claim 1, wherein the cartridge includes a locating feature for locating the electrical connector in the cavity relative to the window.

8. The connector assembling machine of claim 1, wherein the cartridge walls include a first side wall, a second side wall, and an end wall between the first and second side walls, the first and second side walls including first and second grooves, respectively, configured to receive a flange of the connector housing to locate the connector housing in the cavity, the end wall having the window.

9. The connector assembling machine of claim 8, wherein the cavity is open between the first and second side walls opposite the end wall.

10. The connector assembling machine of claim 8, wherein the side walls are separate and discrete from the end wall and coupled thereto.

11. The connector assembling machine of claim 8, wherein the first side wall is coupled to the mounting bracket.

12. The connector assembling machine of claim 1, wherein the end walls of the frame include bearings supporting the shaft.

13. The connector assembling machine of claim 1, wherein the cartridges are configured to have the electrical connector loaded and unloaded in directions parallel to the shaft, the windows configured to receive the support plates in a loading direction perpendicular to the shaft.

14. The connector assembling machine of claim 1, further comprising a support plate loader mechanism adjacent the revolver mechanism, the support plate loader mechanism having a support plate manipulator and an end effector provided at an end of the support plate manipulator, the end effector configured to hold the support plates, the support plate manipulator configured to move the end effector and the support plates to the processing station to load the support plates in the receptacles of the electrical connectors.

15. A connector assembling machine for assembling electrical connectors each including a connector housing holding contacts arranged in receptacles supported by support plates received in the receptacles, the connector assembling machine comprising:
a frame having a base and end walls extending from the base;
a revolver mechanism coupled to the frame, the revolver mechanism including a shaft coupled to the end walls, an actuator operably coupled to the shaft to rotate the shaft, and a rotor rotated by the shaft, the rotor including a hub coupled to the shaft and mounting brackets extending from the hub, the revolver mechanism including cartridges coupled to the mounting brackets, each cartridge including cartridge walls forming a connector cavity configured to receive an electrical connector, the cartridge walls including a first side wall, a second side wall, and an end wall extending between the first and second side walls, the first and second side walls including first and second grooves, respectively, configured to receive a flange of the connector housing to locate the connector housing in the cavity, the end wall having a window exposing the receptacles of the electrical connector in the cavity;
wherein the rotor is rotated to move the cartridges between a connector loading station, a connector processing station, and a connector unloading station, the cartridges configured to be loaded with the electrical connectors in the connector loading station, the cartridges configured to be unloaded in the connector unloading station, the cartridges positioning the electrical connectors for loading the support plates into the receptacles of the connector housings in the connector processing station.

16. The connector assembling machine of claim 15, wherein the connector processing station is positioned a first radial distance from the connector loading station and a second radial distant from the connector unloading station, the first distance being equal to the second distance.

17. The connector assembling machine of claim 15, wherein the windows face in a first direction at the connector loading station, the windows facing in a second direction at the connector processing station, and the windows facing in a third direction at the connector unloading station.

18. The connector assembling machine of claim 15, wherein the cavity is open between the first and second side walls opposite the end wall.

19. A connector assembling machine for assembling electrical connectors each including a connector housing holding contacts arranged in receptacles supported by support plates received in the receptacles, the connector assembling machine comprising:
a frame having a base and end walls extending from the base;
a revolver mechanism coupled to the frame, the revolver mechanism including a shaft coupled to the end walls, an actuator operably coupled to the shaft to rotate the shaft, and a rotor rotated by the shaft, the rotor including a hub coupled to the shaft and mounting brackets extending from the hub, the revolver mechanism including cartridges coupled to the mounting brackets, each cartridge including cartridge walls forming a connector cavity configured to receive an electrical connector, the cartridge having a window exposing the receptacles of the electrical connector in the cavity, wherein the rotor is rotated to move the cartridges between a connector loading station, a connector processing station, and a connector unloading station, the cartridges configured to be loaded with the electrical connectors in the connector loading station, the cartridges configured to be unloaded in the connector unloading station, the cartridges positioning the electrical connectors for loading the support plates into the receptacles of the connector housings in the connector processing station; and
a support plate loader mechanism adjacent the revolver mechanism, the support plate loader mechanism having a support plate manipulator and an end effector provided at an end of the support plate manipulator, the end effector configured to hold the support plates, the support plate manipulator configured to move the end effector and the support plates to the processing station to load the support plates in the receptacles of the electrical connectors.

20. The connector assembling machine of claim 19, wherein the support plate manipulator includes a robotic arm movable in three-dimensional space to load the support plates in the electrical connector held in the cartridge.

* * * * *